(12) United States Patent
Bock

(10) Patent No.: US 8,573,537 B2
(45) Date of Patent: Nov. 5, 2013

(54) AIRCRAFT SUB-ASSEMBLY AND AIRCRAFT PROVIDED WITH SUCH A SUB-ASSEMBLY

(75) Inventor: Thomas-Mathias Bock, Grenade-sur-Garonne (FR)

(73) Assignee: Airbus, Blagnac (FR)

( * ) Notice: Subject to any disclaimer, the term of this patent is extended or adjusted under 35 U.S.C. 154(b) by 378 days.

(21) Appl. No.: 12/377,012

(22) PCT Filed: Aug. 10, 2007

(86) PCT No.: PCT/FR2007/001364
§ 371 (c)(1),
(2), (4) Date: Feb. 10, 2009

(87) PCT Pub. No.: WO2008/017763
PCT Pub. Date: Feb. 14, 2008

(65) Prior Publication Data
US 2010/0163674 A1    Jul. 1, 2010

Related U.S. Application Data

(60) Provisional application No. 60/850,635, filed on Oct. 11, 2006.

(30) Foreign Application Priority Data

Aug. 10, 2006    (FR) ...................................... 06 07254

(51) Int. Cl.
*B64D 11/06*    (2006.01)
(52) U.S. Cl.
USPC .................................... 244/118.6; 244/122 R

(58) Field of Classification Search
USPC ......................... 244/118.5, 118.6, 121, 122 R
See application file for complete search history.

(56) References Cited

U.S. PATENT DOCUMENTS

| | | | | |
|---|---|---|---|---|
| D257,601 S | * | 12/1980 | Cyplik ........................... D6/332 |
| 5,024,398 A | * | 6/1991 | Riedinger et al. .......... 244/118.5 |
| D330,638 S | * | 11/1992 | Moschini ....................... D6/334 |
| D353,946 S | * | 1/1995 | Fischer et al. ................. D6/332 |
| 5,651,219 A | * | 7/1997 | Baloga et al. ..................... 52/32 |
| 5,954,401 A | | 9/1999 | Koch et al. |

(Continued)

FOREIGN PATENT DOCUMENTS

| | | |
|---|---|---|
| DE | 10 2004 063 094 | 7/2006 |
| EP | 1 571 037 | 9/2005 |
| WO | 2004 083035 | 9/2004 |

OTHER PUBLICATIONS

U.S. Appl. No. 12/377,012, filed Feb. 10, 2009, Bock.

(Continued)

*Primary Examiner* — Peter Brown
(74) *Attorney, Agent, or Firm* — Oblon, Spivak, McClelland, Maier & Neustadt, L.L.P.

(57) ABSTRACT

An aircraft sub-assembly including at least one seat and/or rest for a passenger, a separation panel extending along one of the two opposed sides of the at least one seat, with a longitudinal dimension at least equal to that of the at least one seat and a vertical dimension or height higher than that of the at least one seat so as to conceal at least partially a passenger occupying the at least one seat behind the separation panel. The separation panel includes a transverse curve extending perpendicularly to its height and along one of the two opposed sides of the at least one seat.

17 Claims, 5 Drawing Sheets

(56) References Cited

U.S. PATENT DOCUMENTS

| | | | |
|---|---|---|---|
| 5,992,798 A * | 11/1999 | Ferry | 244/118.6 |
| 6,059,364 A * | 5/2000 | Dryburgh et al. | 297/354.13 |
| D427,783 S * | 7/2000 | Luedke | D6/332 |
| D439,063 S * | 3/2001 | Round et al. | D6/356 |
| D458,041 S * | 6/2002 | Couture et al. | D6/332 |
| 7,188,806 B2 * | 3/2007 | Beroth | 244/122 R |
| D558,993 S * | 1/2008 | Saint-Jalmes et al. | D6/357 |
| 7,419,214 B2 * | 9/2008 | Plant | 297/245 |
| 7,523,888 B2 * | 4/2009 | Ferry et al. | 244/118.6 |
| 7,607,612 B2 * | 10/2009 | Baatz et al. | 244/118.6 |
| 7,665,693 B2 * | 2/2010 | Bettell | 244/122 R |
| 2006/0086864 A1 | 4/2006 | Beroth | |
| 2006/0170261 A1 | 8/2006 | Baatz et al. | |
| 2007/0145187 A1 | 6/2007 | Beroth | |

OTHER PUBLICATIONS

U.S. Appl. No. 12/374,756, filed Jan. 22, 2009, Bock.

* cited by examiner

AIRCRAFT SUB-ASSEMBLY AND AIRCRAFT PROVIDED WITH SUCH A SUB-ASSEMBLY

The invention relates to an aircraft subassembly that comprises a seat or a sitting space for an aircraft passenger.

On commercial aircraft flights, in particular in the so-called higher classes (first classes, "business" classes . . . ), the passengers receive special attention from the aircraft manufacturers.

In particular, the latter provide more space than for passengers in the so-called "economy" classes, and generally offer more and more services to enhance the comfort of the passengers.

The passengers in the higher classes thus may tilt their seat into a more or less horizontal position, sometimes even convert their armchair into a bed because the seats positioned in front and behind are sufficiently far away.

The seats also are set apart from one another laterally in order to provide more space for the passengers.

Nonetheless, despite all the care devoted to the arrangement of the personal space for the passengers in these higher classes, these passengers sometimes feel the need to have more privacy with regard to the other passengers, who very often are strangers.

In order to meet such a need, they must go to the lavatories or into another place in the aircraft, such as an area specially laid out for isolating oneself from the other passengers.

Such a specific area, however, reduces the space available for installing passenger seats.

Furthermore, passengers also seek a certain privacy when they wish to lie down in order to sleep and, unfortunately, in current aircraft nothing is provided for this purpose.

This invention seeks to remedy at least one of the aforementioned drawbacks by proposing an aircraft subassembly comprising at least one seat and/or sitting space for a passenger, characterized in that it also comprises a separating panel that extends along one of the two opposite sides of the said at least one seat, along a longitudinal dimension at least equal to that of the said at least one seat and along a vertical dimension or height greater than that of the said at least one seat, so as to wholly or partially conceal behind the panel a passenger occupying the said at least one seat, the separating panel having, perpendicular to its height, along one of the two opposite sides of the at least one seat, a so-called transverse curvature.

Such a subassembly provides more privacy to the passengers than the moving away of the other seats which, when all is said and done, is limited.

The separating panel in fact may conceal the passenger occupying the seat of the subassembly from the gaze of other passengers occupying other seats of the aircraft cabin in which the subassembly is arranged.

The passenger settled in the subassembly according to the invention thus does not need to get up from his seat in order to be shielded from view.

The positioning of the curved separating panel along the passenger seat, without extending beyond the front of the seat, does not encroach on the space situated in front of the seat or on the front space situated obliquely in relation to the seat.

For this reason, the addition of the separating panel next to the seat does not restrict the free space around the seat for accessing same.

Furthermore, the panel only separates the passenger seat physically from the other passenger seats without, for all that, enclosing the passenger seat inside a module.

Such a module would result in completely isolating the passenger from the rest of the cabin and, in this very way, would give him the feeling of being confined and therefore having less free space.

By virtue of the invention, the passenger does not have this feeling of confinement.

Moreover, installing modules around the passenger seats would result in generally reducing the free space throughout the cabin of the aircraft in which these modules would be set up. The passengers moving about in the cabin therefore would experience a general unpleasant feeling of confinement.

Moreover, the design of the ventilation installations of the cabin would have to be revised because the walls constituting the modules would disrupt the air flows coming from standard installations.

Having a separating panel adjacent to a passenger seat is a simple solution the implementation of which does not require incidental arrangements, or the setting aside of specific areas in the airplane for this purpose.

Furthermore, the addition of a panel does not indiscriminately increase the load of the aircraft.

In this respect, light materials such as an alveolar (honeycomb) structure in particular may be used.

The transverse curvature contributes to increasing the rigidity of the panel. This curvature also imparts to the panel a greater stability than a straight panel when it is arranged on the floor of the cabin of an aircraft.

This proves to be useful when a passenger who is standing in an aisle and talking with another seated passenger leans on the panel, in particular on the portion of the panel running along the seat.

It will be noted that the curved panel according to the invention may be arranged along one of the two opposite sides of an isolated seat or be laid out along one of the two opposite sides of a seat-sitting space assembly in which the sitting space is positioned behind the seat.

According to one characteristic, the transverse curvature extends along the entire height of the panel.

According to one characteristic, the curvature has a concavity that is oriented toward the said at least one seat.

For this reason, the convex portion of the panel is turned toward the outside of the subassembly, which makes it possible to facilitate the movement of individuals circulating in the cabin and passing along the panel, as well as of carts and baggage.

The risk of injuries to these individuals on contact with the panel, which provides a smooth and cambered surface toward the outside, moreover is reduced.

Furthermore, the concavity oriented toward the seat provides more lateral free space for the seated passenger than a straight panel.

The transverse curvature of the panel is defined by the variation in geometric orientation of a tangent vector at the outer face of the panel and which moves on this face between the so-called front end of the panel, situated at the front of the seat, and the so-called back end of the panel, situated at least at the back of the seat, or even beyond when a sitting space is positioned behind the seat.

According to one characteristic, at least one of the opposite sides of the seat along which the panel is arranged also is curved, and the curvatures of the panel and of the seat are adapted to one another, for example identical or at least similar.

According to one characteristic, the separating panel is in the overall shape of a tile.

According to one characteristic, the separating panel comprises, in its lower portion, a pedestal intended to be fastened to the floor of an aircraft cabin.

This pedestal makes it possible to provide easily for the fastening of the panel and also contributes to increasing the rigidity and stability of the panel.

According to one characteristic, the separating panel has, in its upper portion, a convex curvature projecting in a plane containing the longitudinal and vertical directions of extension of the panel.

Such a form makes it possible, on the one hand, to reduce the risks of injury in comparison with a straight upper edge with sharp angles and, on the other hand, to clear the side vision space of the seated passenger.

According to one characteristic, the aircraft subassembly furthermore comprises a sitting space behind the seat for the passenger, aligned along the longitudinal direction of extension of the separating panel, the said separating panel also extending along this direction, along one of the two sides of the sitting space.

According to one characteristic, the separating panel forms a return behind the passenger seat or the sitting space in a direction more or less perpendicular to the longitudinal direction.

According to one characteristic, the separating panel extends from one of the two opposite sides of the passenger seat to the other side, passing behind the said seat.

According to one characteristic, the aircraft subassembly comprises two passenger sets arranged parallel to one another, the separating panel extending from one of the two opposite sides of the first seat to one of the two opposite sides of the second seat, passing behind the two seats, so as to form a kind of open alcove on the front of the said seats.

The invention also has as an object an aircraft comprising at least one aircraft subassembly in accordance with the subassembly briefly set forth above and which is laid out on a floor of a cabin of the aircraft.

According to one characteristic, the said at least one aircraft subassembly is fastened to the floor of the cabin.

According to one characteristic, the separating panel and the said at least one passenger seat of the said at least one aircraft subassembly are mechanically independent of one another.

This makes it possible easily to associate at least one panel with one or more seats or sitting spaces for passengers without, however, calling into question the design of the seat/sitting space or seats/sitting spaces.

In this way the installation of a panel next to a passenger seat is easy, as is its dismantling.

As the subassembly is not cast in one piece, its components may be introduced into the aircraft one after the other, which facilitates handling and installation operations.

According to one characteristic, the height of the separating panel is less than the height of the aircraft cabin and is sufficient to conceal wholly or partially behind the panel a passenger occupying the said at least one seat with regard to another seated passenger.

On the other hand, the height of the panel is limited in order to ventilate the cabin as well as to leave the cabin space as open as possible, and thus to avoid a feeling of confinement.

According to one characteristic, the aircraft comprises several aircraft subassemblies laid out on the floor of the cabin.

According to one characteristic, each of the passenger seats of the subassemblies is arranged along an aisle of the cabin and each of the separating panels is positioned between the corresponding aisle and the seat.

According to one characteristic, the aircraft subassemblies arranged on both sides of an aisle are laid out in staggered rows.

The privacy of the passengers thus is increased by staggering the subassemblies in relation to each other along an aisle.

According to one characteristic, since each of the separating panels of the aircraft subassemblies has a large convex face, the convex faces of the separating panels arranged on both sides of an aisle are oriented toward the aisle.

Other characteristics and advantages will emerge in the course of the description that is going to follow, given by way of non-limitative example and presented with reference to the attached drawings, on which:

Figure 1:
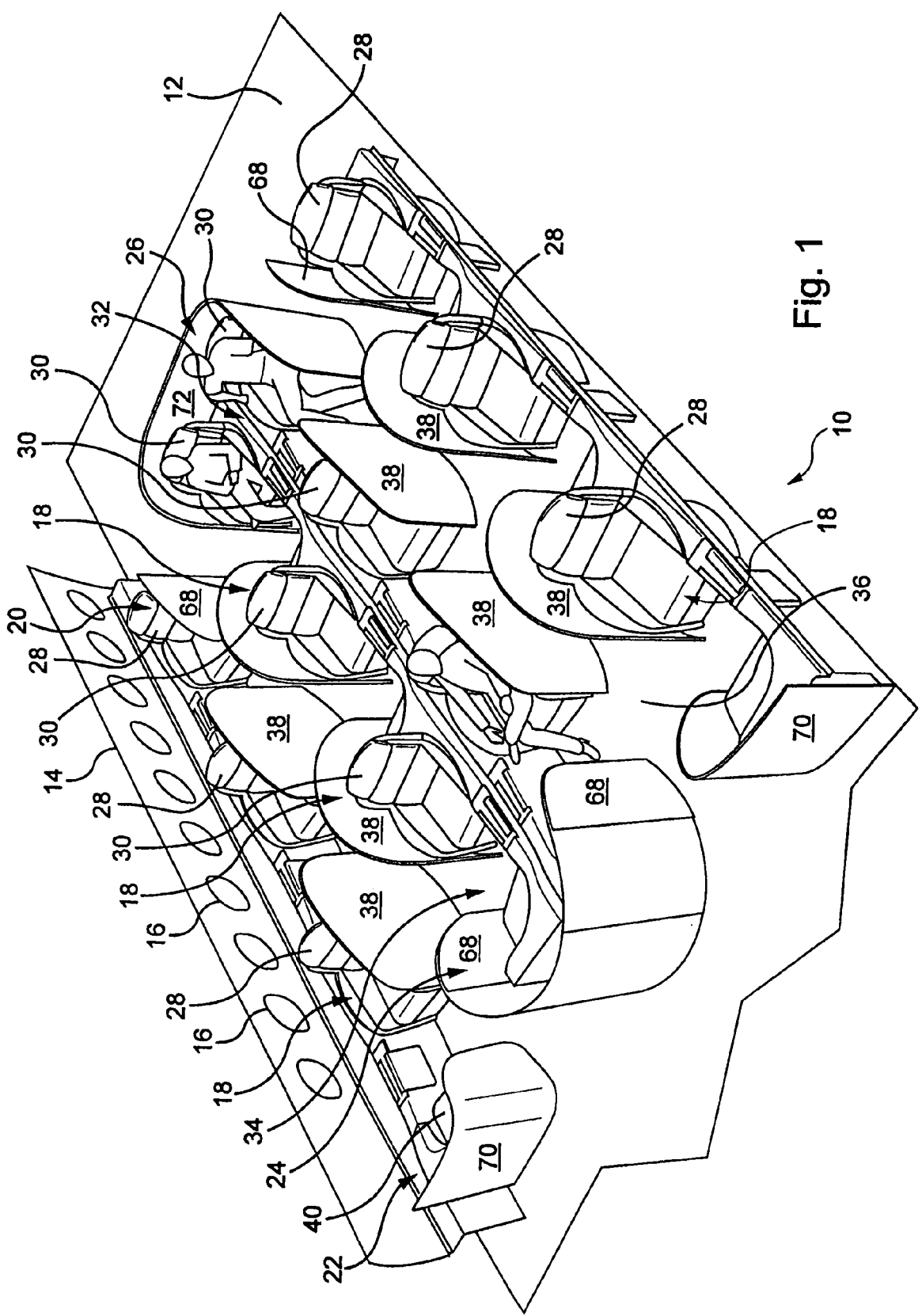
FIG. 1 is a general schematic representation of a cabin of an aircraft in which subassemblies according to the invention are installed.

As shown partially on FIG. 1 and designated with the general reference marked 10, an aircraft cabin comprises a floor 12, side walls only one of which 14 provided with windows 16 is shown, as well as a ceiling not shown on this Figure for the sake of clarity.

On this Figure, different cabin arrangements have been shown, and in particular aircraft subassemblies according to the invention which comprise seats or sitting spaces for passengers, as well as one or more separating panels.

On this Figure, several different types of aircraft subassemblies according to the invention are shown and thus offer several possibilities for implementation of the invention.

The different types of subassemblies are indicated with the general references marked 18, 20, 22, 24 and 26.

In this cabin, different seats and sitting spaces for passengers are installed, namely seats 28 arranged along walls 14 of the cabin. In the central portion of the latter, seats 30 are installed in pairs, two seats 30 of the same pair being separated from one another by a longitudinal central compartment 32 that extends between several pairs of seats and that serves, for example, to store passengers' baggage.

These seats 30 are used most particularly by passengers traveling as a couple and seats 28 by individuals alone.

It will be noted that seats 28 and seats 30 are positioned on both sides of an aisle having a longitudinal direction, two aisles 34 and 36 being provided in the cabin for the movement of passengers and flight personnel.

It will be noted that the aircraft layouts or subassemblies according to the invention are arranged in staggered rows in relation to each other, on both sides of each aisle, in order to enhance the concealing effect produced by the separating panels of these subassemblies.

It will be noted that each of the aircraft subassemblies according to the invention is laid out on the floor 12 of the cabin as will be described later with reference to FIGS. 8 and 9.

Each aircraft subassembly according to the invention comprises a seat or a sitting space, or even a seat and a sitting space or even two seats, as well as one or more nontransparent separating panels the dimensions of which are such that they make it possible to conceal wholly or partially behind them a passenger occupying the seat or the sitting space concerned.

This effect which contributes to a greater privacy for the passengers occupying such subassemblies is obtained through the presence of the panel or panels, their positioning in relation to the seat and/or sitting space and their dimensions.

Figure 2:
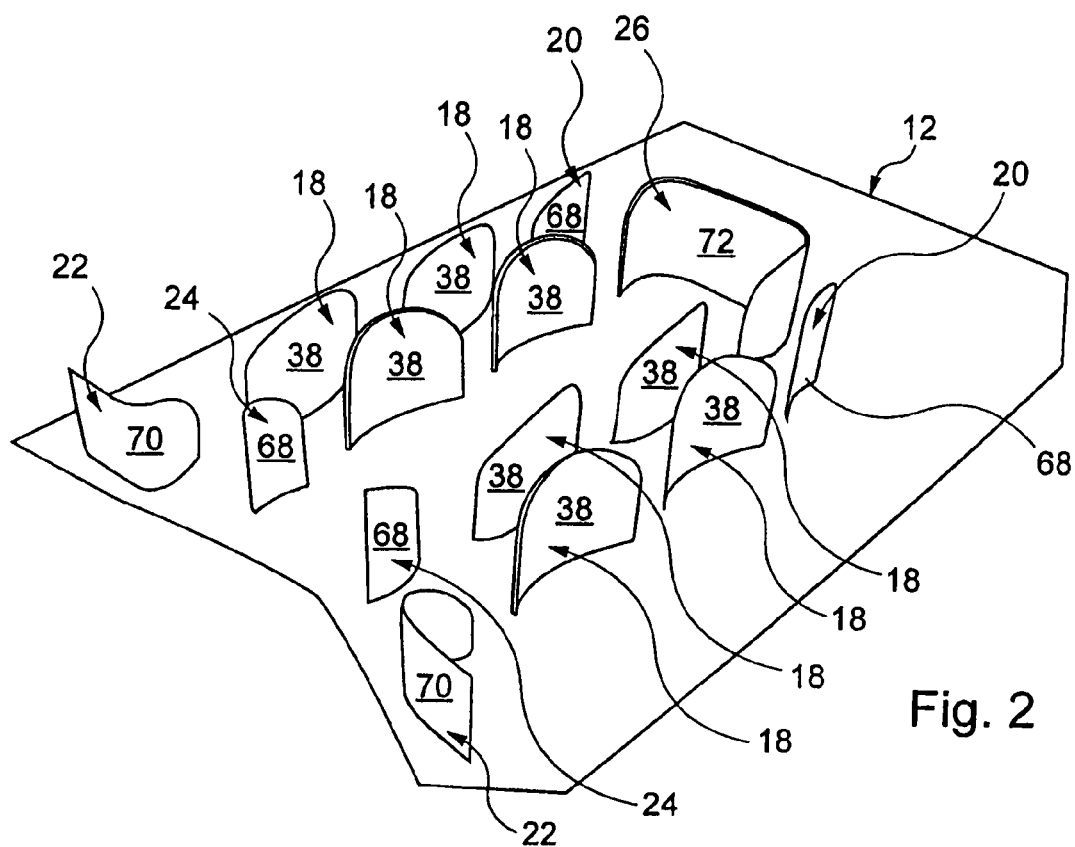
FIG. 2 is a general schematic view similar to that of FIG. 1 and showing only the installation of a portion of the subassemblies shown in FIG. 1.

The floor 12 of the cabin of the aircraft has been shown on FIG. 2, removing all fittings or facilities other than the separating panels of the aircraft subassemblies according to the invention.

Thus on this Figure the installation of the panels of the different types of aircraft subassemblies 18, 20, 22, 24 and 26 is discerned.

Such a representation makes it possible to note that the presence of the panels does not overcrowd the layout of the cabin, does not block the aisles of the latter and therefore does not hinder the movement of the passengers and the flight personnel.

Furthermore, and as may be noted on FIG. 1, the arrangement of the panels does not reduce the free space around the seats or sitting spaces for passengers and, in particular, does not restrict the passengers' access to these seats or sitting spaces.

Figures 3, 4:
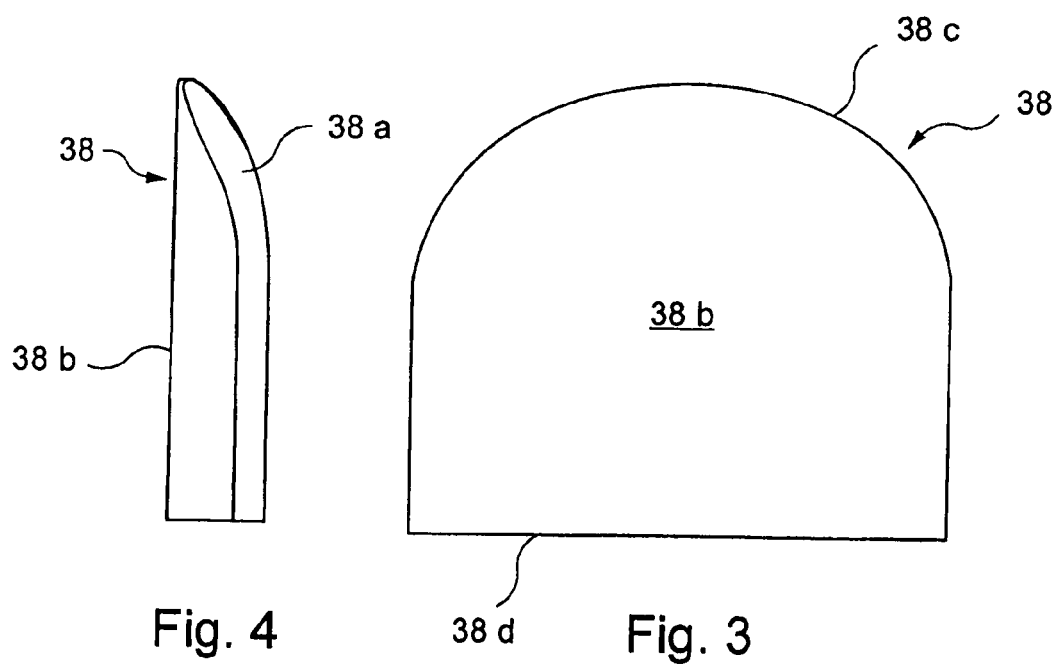
FIG. 3 illustrates in a front view a portion of a subassembly such as shown in FIG. 2.
FIG. 4 illustrates a side view of the portion of the subassembly shown in FIG. 3.

Two separating panels 38 of the aircraft subassembly 18, shown on FIGS. 1 and 2, have been shown on FIGS. 3 and 4.

The panel 38 is shown in a front view on FIG. 3 just as an observer who might be seated in the aisle would see it, thus concealing from the gaze of this observer the seat and/or the sitting space positioned behind the panel, or at least the back and the portion thereof occupied by the torso of the passenger.

It will be noted that this panel is interposed between the aisle, along which the subassembly concerned is laid out, and the seat and/or sitting space for a passenger that forms part of the subassembly.

As shown on FIGS. 3 and 4 that illustrate the panel 38 in a vertical position, the latter has, perpendicular to its height, a transverse curvature that here imparts an overall tile shape thereto.

Figure 6:
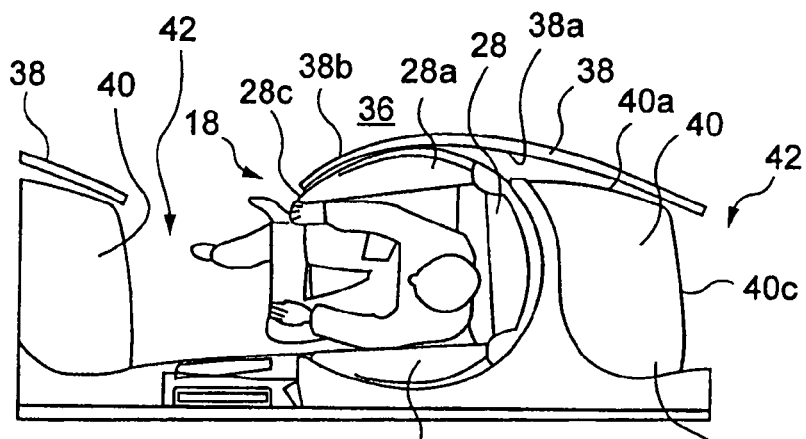
FIG. 6 is a view of FIG. 5 from above.

The transverse curvature of the panel is present at least in the portion of the panel running along the seat, that is, along one of the two opposite sides of the seat, the sides where the armrests are situated. This curvature begins at the front end of the panel that is situated at the front of the seat and extends at least to the seat back (panel 68 along seat 28 on FIG. 1), or even farther toward the rear so as to border a sitting space 40 for example (FIG. 6).

This curvature furthermore extends over the greater portion of the height of the panel, or even the entirety thereof.

It will be noted that other forms of cambered or curved panels also may be adopted to the extent that their dimensions ensure, at least in part, the concealment of the seat and the passenger.

The curved panel thus comprises two large opposite faces, a concave inner face 38a and an opposite convex outer face 38b.

When such a panel is laid out against a passenger seat and/or sitting space (FIGS. 1 and 6), the concave inner face 38a is oriented toward the seat and/or the sitting space, which conceals the passenger positioned in the seat and/or the sitting space more than if the convex face of the panel was turned toward him.

Moreover, as shown on FIGS. 1 and 2, the large convex faces 38b of the separating panels are oriented toward the aisle 34 or 36, depending on the circumstances.

This layout favors the movement of the passengers and the cabin personnel, since when moving about in the aisles they can come into contact only with cambered and smooth surfaces, which limits the risk of injuries.

In fact, in the absence of these panels, individuals moving about in the aisles can bump into the passenger seats, in particular the armrests.

Moreover, it will be noted that the separating panel 38 has, in its upper portion, projecting in a vertical plane, such as the one in FIG. 3, a convex curvature implemented, for example, in the form of a rounded upper edge 38c.

This curvature may be described as a vertical curvature.

As for the opposite lower portion 38d of the panel, it is implemented in the form of a straight edge that is intended to be fastened onto the floor 12 of the cabin of the aircraft.

Figure 5:
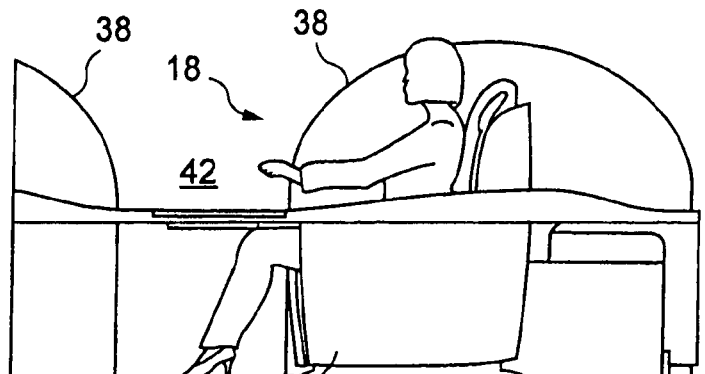
FIG. 5 is a general view showing a passenger settled in a subassembly according to the invention.
Figure 7:
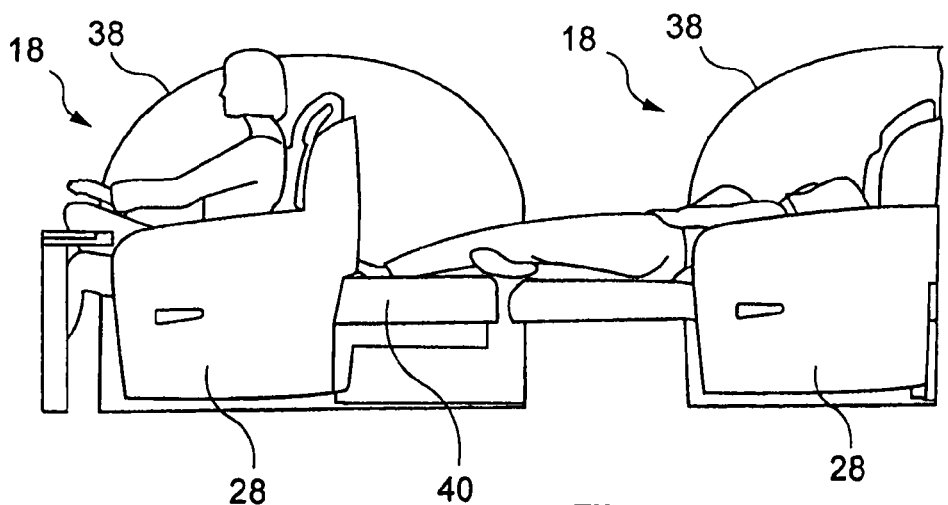
FIG. 7 is a general view showing the interior of another subassembly in which a passenger is settled in lying-down position.

FIGS. 5 to 7 illustrate the use of the aircraft subassembly 18 by passengers in seated and lying-down position.

The separating panel 38 of the subassembly 18 is laid out against a passenger seat 28 and a sitting space 40.

This sitting space is arranged aligned with the seat along the longitudinal direction of the aisle 36 along which the subassembly 18 is positioned.

As shown on FIGS. 5 to 7, the separating panel 38 extends longitudinally along one of the two opposite sides 28a and 28b of the passenger seat 28, and this extension is continued along one of the two opposite sides 40a, 40b of the passenger sitting space 40.

As shown on FIG. 6, the panel even may extend slightly beyond the front end 40a of the sitting space 40, but generally the length or longitudinal dimension of the panel is more or less equal to that of the seat and/or the sitting space to be concealed.

In this way the panel 38 comes to cover only one of the two sides of the seat 28 and sitting space 40 assembly (side 28a of the seat and side 40a of the sitting space), in order not to encroach on the free space situated around the passenger seat and the sitting space and, in particular, on the front free space 42 situated in front of each seat and in front of each sitting space (FIGS. 5 and 6).

The seated passenger therefore has freedom of movement while being shielded from prying eyes.

Furthermore, his movements are not hampered, when he wishes, for example, to stretch out his legs or leave or go back to his seat or his sitting space.

As a matter of fact, no partition is provided between two successive panels 38 to close off the space existing between them, and the panel 38 adjacent to the seat 28 does not extend beyond the front end 28c of the seat (FIG. 6).

In other words, the separating panel is positioned at a place which, in any case, does not hinder anyone and particularly not the seated passenger.

It also will be noted that the curvature of the panel follows the curvature of the sides of the seat and of the sitting space (FIG. 6). In this way there is no wasted space between the panel and the seat and the sitting space; the available space in the cabin therefore is optimized.

Furthermore, similar or even identical curvatures between the panel and the seat and the sitting space make the subassembly more compact, more homogeneous.

In this way the passengers, such as shown on FIGS. 5 and 7, are partially concealed behind the panels 38, whether in seated position (FIG. 5 and left portion of FIG. 7) or in lying-down position when the seat 28 is converted into a bed with the aid of the sitting space 40 (right portion of FIG. 7).

It also will be noted that the sitting surface 40 may be occupied by another passenger coming to sit down facing the passenger seated in the seat 28, in this way benefiting from a certain privacy provided by the presence of the panels 38.

As noted above, the longitudinal dimensions of the panel are sufficient to cover a seat and a sitting space laterally without restricting access thereto or hindering the movements of the passengers. The panel moreover is placed sufficiently close to the seat or the sitting space and is sufficiently thin so as not to encroach excessively on the free space in the aisle in which the passengers and carts pushed by the flight personnel move about.

Furthermore, the panel 38 also extends along a vertical direction, over a height making it possible to conceal at least partially a passenger seated on the seat 28 or the sitting space 40, with the exception, however, of the upper portion of the head of the tallest passengers.

Generally speaking, the height of the panel should be greater than that of the seat or the sitting space and be sufficient to conceal a passenger occupying the seat or the sitting space with regard to other passengers seated at other places in the cabin and, in particular, passengers seated on the other side of the aisle.

Figure 11:
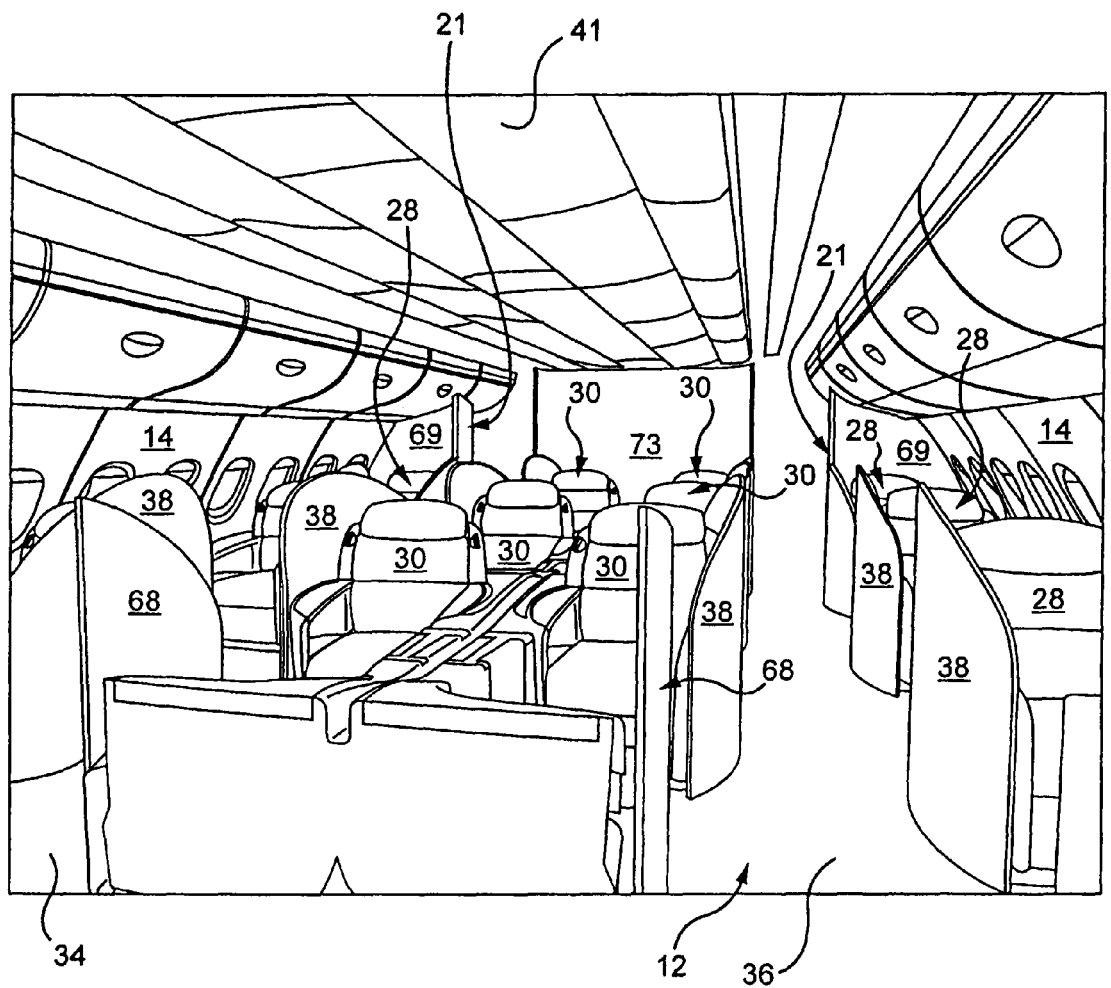
FIG. 11 is a perspective view showing aircraft subassemblies according to the invention laid out in an aircraft cabin.

The height of the panel also should be less than the height of the ceiling of the cabin of the aircraft (see the height of the panels 38 in relation to the ceiling 41 on FIG. 11) in order to avoid disrupting the air flow coming from the ventilation system of the cabin.

A height of 1.30 meters constitutes a non-limitative example of panel height that meets these requirements.

Moreover, it will be noted that the panel is mechanically independent of the seat and/or the sitting space.

In this manner, a panel may be added next to a seat previously installed in an aircraft cabin, even if the initial layout of the cabin did not provide for it.

Furthermore, linking the panel mechanically to the seat and/or to the sitting space would necessitate revising the design of the seat and/or the sitting space, and also obtaining a new 16G certification for the aircraft subassembly so produced.

Figure 8:
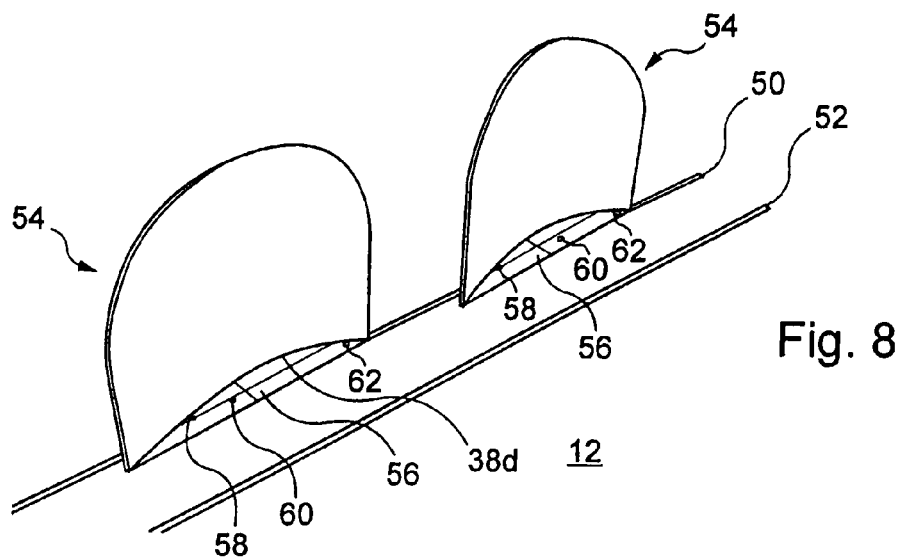
FIG. 8 is a general schematic view in perspective, showing, for two subassemblies, the fastening of a portion of each subassembly to the floor of the cabin of the aircraft.
Figure 9:
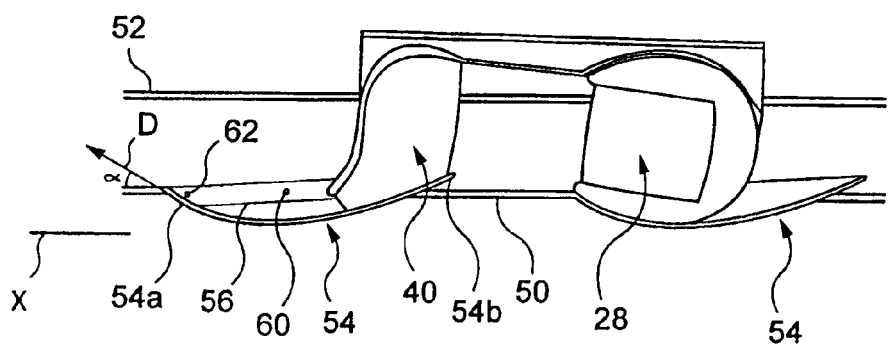
FIG. 9 is a general schematic view from above showing the portions of the subassembly shown on FIG. 8, in association with seats or sitting spaces for passengers.

On FIGS. 8 and 9 there has been shown the fastening, onto the floor 12 of the aircraft cabin, of the separating panels and, more generally, of the aircraft subassemblies according to the invention.

On FIG. 8, two longitudinal rails 50, 52 that usually are intended for fastening of the passenger seats and other fittings onto the floor of the cabin are shown.

On this Figure, the separating panels 54 of the aircraft subassemblies according to the invention have been slightly modified in relation to the panels 38 of the preceding Figures by the addition, at their lower portion, of a pedestal 56 facilitating installation of the said panels.

The pedestal 56 extends from the lower rounded edge 38*d* of the panel perpendicular to the height of the said panel.

Projecting into a plane perpendicular to the height of the panel (horizontal plane of FIG. 9), the pedestal 56 closes off the concave space delimited by the curved panel 54.

The presence of this pedestal or base reinforces the rigidity of the panel 54 and its vertical stability.

Furthermore, the presence of this pedestal facilitates mounting of the panel on the rail 50.

As a matter of fact, with such a pedestal, it suffices to provide fastening mechanisms such as screws that pass through the thickness of the pedestal to come to be fastened inside the rail 50.

Figure 10:
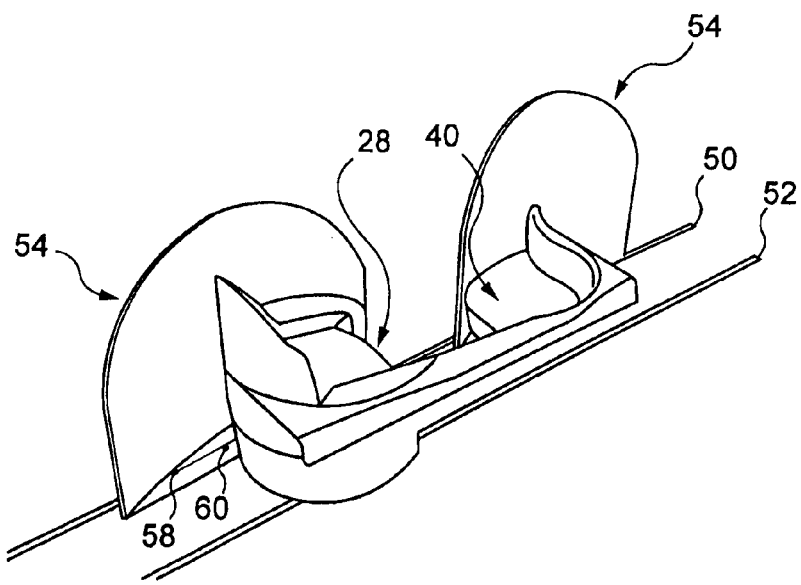
FIG. 10 is a general schematic view in perspective of the subassemblies shown on FIG. 9.

Such fastening means 58, 60, 62 are shown on FIGS. 8 to 10.

The seat 28 and the sitting space 40 are, for their part, fastened in standard manner to the other rail 52, as shown on FIGS. 9 and 10.

On FIG. 9, the orientation of a tangent vector at the outer face of the curved separating panel 54 has been shown with the reference marked D.

The successive orientations assumed by this vector, following the outer face of the panel, define the convexity of the latter which extends from the front end 54*a* of the panel to the back end 54*b* of the panel.

The direction assumed by this vector at the front end 54*a* of the panel, where the vector is formed, creates an angle $\alpha$ approximately equal to +25° in relation to the longitudinal direction X of the airplane (longitudinal direction of the rails and the aisles of the cabin).

This angle should not take on overly high values too greatly exceeding those of the curvature of the seat, because the two curvatures (seat and panel) then would be too different from one another.

Moreover, the front end 54*a* should not come around in front of the seat and thus restrict the front space for the passenger.

An overly high value of the angle $\alpha$ in relation to +25° well might close off this space.

When the tangent vector runs along the outer convex face, from the back end 54*b* of the panel to the front end 54*a*, the angle $\alpha$ varies between approximately −10° and +25° in relation to the direction X.

It will be noted that the seats used in the so-called higher classes, such as the passenger seats 28, are provided with a certain number of fittings that make the structure of the seats more complicated and in particular necessitate having recourse to motors.

Thus the internal structures of these seats generally are protected by outer casings in order to conceal the internal mechanisms and electrical circuits from the outside.

In an aircraft subassembly according to the invention, by arranging a separating panel on the side of the passenger seat, certain internal components of the seat thus may be concealed without having recourse to a special casing, which proves to be particularly advantageous.

As shown on FIGS. 1 and 2, a second type of aircraft subassembly or fitting according to the invention is shown in the form of the unit 20.

This subassembly comprises a passenger seat 28 as well as a separating panel 68 that extends laterally in relation to the seat, along one of the two opposite sides of the latter along a longitudinal direction and a vertical direction.

The longitudinal and vertical dimensions of the panel are sufficient to conceal the passenger seated on the seat 28 from the gaze of the other passengers seated in other seats of the cabin.

Of course, just as for the other aircraft subassemblies according to the invention, the height of the panel is greater than that of the seats in order to provide a protection of the passenger's privacy, and therefore to set aside a private space for him.

This subassembly, however, does not comprise any sitting space positioned behind the seat for the passenger and the panel 68 therefore has a longitudinal dimension less than that of the panel 38.

The shape of the panel 68 also is curved and, in a view from above (projecting into a plane perpendicular to its height), thus has a semicircular contour.

The longitudinal dimension of the panel 68 of the subassembly 20 corresponds, for example, to half of that of a separating panel 38.

According to a variant shown in FIG. 11, the subassembly 21 comprises a separating panel 69 that extends along one side of the seat 28 and forms a return behind this seat, more or less perpendicular to the longitudinal direction of extension along the aisle 34 or 36.

In this variant, the height of the panel is greater than that of the panels 68 and 38 positioned at the front of the cabin.

Another type of aircraft subassembly 24 comprises a sitting space 40 and a separating panel identical to the aforementioned separating panel 68.

As shown on FIG. 1, the two separating panels 68 of subassembly 24 are associated with other partitions arranged in more or less rounded manner so as to link the said panel 68.

Aircraft subassembly 22 also represents another type of subassembly associating a sitting space 40 for a passenger and a separating panel 70 that extends longitudinally along one of the sides of the passenger sitting space, parallel to the aisle, then continues more or less perpendicular to this direction behind the sitting space, forming a return.

The height of the separating panel 70 is identical to the height of the panels of the other subassemblies, but it is possible, however, for the panels of the different subassemblies to have different heights in relation to each other.

That allows a better circulation of the air coming from the air-conditioning system as well as a visual clearance for security.

Thus, for example, the panel 70 may have a height less than that of the other panels.

It will be noted that different panel sizes can change the perception of space by the passengers. It thus is possible to increase the height of the panels from the front toward the rear of the cabin so as to give a feeling of generous space.

The interior of the cabin shown on FIG. 11 illustrates this aspect with panels 69 and 73 situated at the back of the cabin and which have a height greater than that of panels 38 and 68 situated in the foreground.

On FIG. 1, another type of aircraft subassembly according to the invention is shown and identified with the general reference 26.

This subassembly comprises two passenger seats, marked 30, arranged parallel to one another and separated by the central compartment 32.

The passengers occupying these seats arranged side by side, but nonetheless distanced from one another, generally are occupied by couples, and usually by individuals traveling together.

In this context, the aircraft subassembly 26 comprises a separating panel shielding these individuals from prying eyes with regard to the outside of the subassembly.

The separating panel 72 of the subassembly thus extends from one of the two opposite sides of the first seat 30, namely the side adjoining the aisle 34, to one of the two opposite sides of the second seat 30, namely the side adjoining the aisle 3, through a return that passes behind the two seats.

Such a panel forms a kind of open alcove on the front of the seats 30, partially surrounding the latter.

In this configuration, the curvature of each lateral portion of the panel 72 extends from a plane perpendicular to the longitudinal direction of the rails, where the tangent vector at the outer face of the panel forms a zero angle with the latter (behind seat 30), to the front end of the panel (running along one side of the seat 30), where the tangent vector at the outer face of the panel forms with the latter an angle more or less equal to 115° in relation to the aforementioned plane.

Beyond this angle, the panel would close off the front space for the passenger.

In the interest of economy and optimization, the subassembly may be composed of two parts of the type of panel 68 connected with a straight panel.

It also is conceivable, however, for the subassembly 26 to be made up of only two panels of type 68, each associated laterally with one of the two seats 30.

As shown on FIG. 11, according to a variant, the separating panel 72 of the subassembly 26 of FIGS. 1 and 2 extends vertically well above the seats 30 in its portion situated behind the seats so as to form the panel 73.

On the other hand, on the sides of these seats, the height of the panel 73 does not exceed that of the panel 72.

It will be noted that in all the foregoing, for each type of aircraft subassembly according to the invention it was a matter of a single separating panel, but for various reasons this panel may be made up of several panels, without its affecting the principle of the invention.

Moreover, the panels of the aircraft subassemblies according to the invention in a way constitute screens behind which seated passengers are at least partially concealed.

The invention claimed is:

1. An aircraft comprising:
at least one aircraft subassembly laid out on a floor of a cabin of the aircraft the at least one subassembly including
at least one seat for a passenger; and
a separating panel that extends along one of two opposite sides of the at least one seat between the at least one seat and an aisle, along a longitudinal dimension at least equal to that of the at least one seat and along a vertical dimension or height greater than that of the at least one seat so as to conceal at least partially behind the panel, a passenger occupying the at least one seat, the separating panel including, perpendicular to its height, along one of the two opposite sides of the at least one seat, a transverse curvature that begins at a front end of the separating panel at a front end of the at least one seat in the longitudinal direction and that extends along an entire length of the separating panel from the front end of the separating panel to a seat back of the at least one seat and has a concavity that is oriented toward the at least one seat, the transverse curvature including a convex curvature, projecting in a plane containing longitudinal and vertical directions of extension of the panel, the convex curvature extends along the entire length of the separating panel and forms a rounded upper edge.

2. An aircraft according to claim 1, wherein the transverse curvature extends along the entire height of the panel.

3. An aircraft according to claim 1, wherein the separating panel comprises, at its lower portion, a pedestal configured to be fastened to the floor of the cabin.

4. An aircraft according to claim 1, further comprising a sitting space arranged behind the seat for the passenger, aligned along the longitudinal direction of extension of the separating panel, the separating panel also extending along this direction, along one of the two sides of the sitting space.

5. An aircraft according to claim 4, wherein the separating panel forms a return behind the passenger seat or the sitting space in a direction substantially perpendicular to the longitudinal direction.

6. An aircraft according to claim 1, wherein the separating panel extends from one of the two opposite sides of the passenger seat to the other side, passing behind the seat.

7. An aircraft according to claim 1, comprising first and second passenger seats arranged parallel to one another, the separating panel extending from one of the two opposite sides of the first seat to one of the two opposite sides of the second seat, passing behind the two seats, to form an open alcove on the front of the seats.

8. An aircraft according to claim 1, wherein the at least one aircraft subassembly is fastened to the floor of the cabin.

9. An aircraft according to claim 1, wherein the separating panel and the at least one passenger seat of the at least one aircraft subassembly are mechanically independent of one another.

10. An aircraft according to claim 1, wherein the height of the separating panel is less than the height of the aircraft cabin and is sufficient to conceal at least partially behind the panel a passenger occupying the at least one seat with regard to another seated passenger.

11. An aircraft according to claim 1, comprising aircraft subassemblies laid out on the floor of the cabin.

12. An aircraft according to claim 11, wherein each of the passenger seats of the subassemblies is arranged along the aisle of the cabin and each of the separating panels is positioned between the aisle and the seat.

13. An aircraft according to claim 12, wherein the aircraft subassemblies arranged on both sides of the aisle are laid out in staggered rows.

14. An aircraft according to claim 12, wherein each of the separating panels of the aircraft subassemblies include a convex face, the convex faces of the separating panels arranged on both sides of the aisle being oriented toward the aisle.

15. An aircraft according to claim 1, wherein the at least one seat includes an armrest along the one of the two opposite sides of the at least one seat.

16. An aircraft according to claim 15, wherein a curvature of the armrest corresponds to the transverse curvature of the separating panel.

17. An aircraft according to claim 1, wherein the transverse curvature has a convexity that is oriented toward the aisle.

\* \* \* \* \*